UNITED STATES PATENT OFFICE.

ADOLPH MILLOCHAU, OF NEW YORK, N. Y., ASSIGNOR TO HIMSELF AND ALFRED BERNEY, OF JERSEY CITY, NEW JERSEY.

IMPROVEMENT IN PREPARING A PAINT-OIL.

Specification forming part of Letters Patent No. 37,918, dated March 17, 1863; Reissue No. 1,480, dated May 19, 1863.

*To all whom it may concern:*

Be it known that I, ADOLPH MILLOCHAU, of the State, county, and city of New York, have invented a new and useful mode of making oil to be employed as a substitute for linseed and other analogous oils in the mixing of paints and colors; and I hereby declare that the following is a full, clear, and exact description thereof.

No drawings are annexed to this specification, because they are not necessary to illustrate my invention, as it consists not in machinery or apparatus, but in a new method of procedure, which, when known, may be carried out by means of devices familiar to all chemists.

This improvement relates to producing a cheap and excellent oil for the purpose mentioned from petroleum or coal oil, or from other bituminous oils; and to enable others to make use of my method of manufacture, I will proceed to describe it.

It is well known that in the purifying of petroleum or coal oils the oil is usually mixed with sulphuric acid, for the purpose of removing the impurities, which in a great measure become mechanically combined with the acid and are precipitated with it as the liquid settles. It is also well known that after the operation of purifying is completed a thick, heavy, black residuum remains, which of course is considerably marked by the acid employed in the purification. Prior to my invention this residuum has not been considered of much value, and has frequently been thrown away; but by submitting it to a method of treatment somewhat analogous to what has heretofore been employed in distilling crude coal-oil and some other substances I am enabled to free it of its acid properties and of its impurities, while I retain the consistency and body which it possesses. I thereby convert it into a desirable substitute for linseed and other oils for grinding with paint and colors, because it presents, as I treat it, the consistency and capacity of drying rapidly and of binding the pigment into a hard, tough coating, which renders linseed-oil so valuable for this purpose, and at the same time it can be produced with very great cheapness and ease. To effect this I first mix with any required quantity of the residuum, in the condition in which it may be obtained from oil-works, about forty per cent. of water and thoroughly agitate the compound in any convenient manner for about one to two hours. This is for the purpose of washing out as much as possible of the acid, the greater part of which will be removed by the operation. I then allow the liquid to settle for, say, one to two hours, and afterward draw off the watery portion, which will contain acid and impurities. I also prefer to transfer the oily portion into another vessel than that in which the settling takes place; but this is not essential. I then put into this oily portion about twenty per cent., or from twenty to twenty-five per cent., as may be desired, of caustic soda or potash, or other suitable alkali, of a specific gravity of 25° Baumé, and thoroughly stir or shake the whole mass for about an hour. At the end of this time the action of the alkali will be found to have entirely neutralized and removed the acid remaining in the liquid from the purifying process to which the oil was originally subjected. The mass is then left for twelve hours to settle and separate, after which time the supernatant oil is drawn off, and is ready to be barreled for use, and it will now be found to possess a proper body and the requisite drying qualities to adapt it to be employed in all cases as a substitute for linseed-oil for grinding or mixing with paints. It will cover well, and when dry it produces a gloss resembling varnish.

It sometimes happens that after the liquid has been treated with the alkali another washing with about twenty-five per cent. of pure water will be of benefit. This occurs when the first washing is not thoroughly done; but if it be carefully performed no subsequent washing will be found necessary.

The fineness and purity of the oil prepared by this method may be increased by exposing it during the operation to a moderate steam or other heat in well-known ways, and it may be further improved by bleaching it in open tanks; also, if desired, from one-fifth to one-third of its bulk of turpentine, or of benzine, or similar volatile substances may be added to it to augment its drying properties. The acid water remaining after the first settling may be usefully employed in manufacturing superphosphate of lime. If from forty to eighty per cent. of fresh or salt water is added to the residuum for the purpose of washing in the first instance, the oil will be made exceedingly clear and fine; but where so much is employed a long time will be required for the liquid to settle properly. I therefore do not usually add more than forty per cent., as this renders the oil sufficiently pure for most practical purposes; but the suggestions contained in the last few paragraphs are a part of the knowledge of most chemists, and, though important in the practical manufacture of my improved oil, need not be carried further here.

I wish it to be understood that I am aware that petroleum, crude oil, and similar bituminous products in the crude state have been refined by washing with water and then employing an alkali, and I do not, of course, claim to be the first to make use of these processes, considered by themselves; but,

Having thus described my invention, what I claim as new, and desire to secure by Letters Patent, is—

Making paint-oil of a character substantially as described from petroleum or coal oil or other bituminous oils, substantially in the manner set forth.

A. MILLOCHAU.

Witnesses:
S. D. COZZENS,
ANDREW I. TODD.